United States Patent [19]

Takagawa

[11] Patent Number: 5,071,162
[45] Date of Patent: Dec. 10, 1991

[54] KNEE BOLSTER

[75] Inventor: Masanori Takagawa, Saitama, Japan

[73] Assignee: Honda Giken Kogyo Kabushiki Kaisha, Tokyo, Japan

[21] Appl. No.: 553,833

[22] Filed: Jul. 18, 1990

[30] Foreign Application Priority Data

Jul. 24, 1989 [JP] Japan ................... 1-86772

[51] Int. Cl.⁵ ............................. B60R 21/045
[52] U.S. Cl. ....................... 280/752; 280/732
[58] Field of Search ............... 280/752, 751, 753, 748, 280/732

[56] References Cited

U.S. PATENT DOCUMENTS 4,427,215  1/1984  Weichenrieder et al. .......... 280/752
4,662,649  5/1987  Ikeda et al. ...................... 280/752
4,663,210  5/1987  Schreiber et al. ................. 280/752

Primary Examiner—Kenneth R. Rice
Attorney, Agent, or Firm—Armstrong, Nikaido, Marmelstein, Kubovcik & Murray

[57] ABSTRACT

A knee bolster includes a lid for covering the surface of a glove box mounted in an opening made in that surface of an instrument panel opposed to passenger knees and which has a plate-like shock absorbing member mounted thereon, a reinforcing plate disposed along the peripheral edge of the opening and opposed to an outer edge of the back of the shock absorbing member, and a load bearing member fixed at one end thereof to a vehicle body and opposed at the other end to the back of the reinforcing plate. Accordingly, the knee bolster has a large shock absorptivity and is simple in structure and easy to assemble.

11 Claims, 6 Drawing Sheets

KNEE BOLSTER

BACKGROUND OF THE INVENTION

1. Field of the Invention

The field of the present invention is a knee bolster mounted on an instrument panel to protect legs of a passenger at a collision of an automobile, and more particularly, a knee bolster designed to initially bear a load at a collision by utilization of a lid of a glove box mounted on the instrument panel.

2. Description of the Prior Art

There is such a conventionally known knee bolster described in Japanese Patent Application Laid open No. 207252/86.

This knee bolster has a structure comprising a first hollow double-sided protector member made of two steel sheets placed one on the other and buried in a lid of a love box, a second protector member made of a steel sheet and buried in a periphery of an opening in an instrument panel against which an outer periphery of the lid abuts, and pins projectingly mounted on a back of the first protector member at its left and right portions and opposed to pin holes made in the second protector member.

With this knee bolster, if the knee of a passenger strikes against the lid of the glove box at the time of a collision of an automobile, a load due to this striking is initially absorbed by a deformation of the first protector member. When the deformation of the first protector member is further increased, the pins are engaged into the pin holes in the second protector member. This causes the load applied to the first protector member to be distributed over the second protector member, while causing the first protector member to be locked to the second protector member and to be prevented from being forwardly pushed through.

However, the prior art knee bolster is constructed of only the steel sheets and therefore, suffers from a problem that it is not only difficult to absorb a large shock, but also it is necessary to provide an alignment of the pins of the first protector member with the pin holes in the second protector member, resulting in a difficulty to assemble the knee bolster.

SUMMARY OF THE INVENTION

The present invention has been accomplished with the above circumstances in view, and it is an object of the present invention to provide a knee bolster which has a large shock absorptivity and which is simple in structure and easy to assemble.

To achieve the above object, according to the present invention, there is provided a knee bolster comprising a lid which covers a surface of a glove box mounted in an opening made in that surface of an instrument panel opposed to knees of a passenger and which has a plate-like shock absorbing member mounted on the lid, a reinforcing plate disposed along a peripheral edge of the opening of the instrument panel so as to be opposed to an outer edge of a back of the shock absorbing member, and a load bearing member fixed at one end thereof to a vehicle body and opposed at the other end to a back of the reinforcing plate.

According to the above feature of the present invention, if the knees of the passenger are forwardly moved due to a shock caused by a collision of an automobile to strike against the lid of the glove box mounted on the instrument panel, a load due to this striking is absorbed by a deformation of the plate-like shock absorbing member mounted on the lid. At this time, the outer edge of the back of the shock absorbing member deformed by the load is pushed against the reinforcing plate disposed on the peripheral edge of the opening of the instrument panel to transmit the load to the reinforcing plate in a distributed manner. If the load is too large to be supported by the reinforcing plate, the back of the reinforcing plate is further allowed to abut against the load bearing member through which the load is transmitted to the vehicle body.

The above and other objects, features and advantages of the invention will become apparent from a reading of the following description of the preferred embodiment, taken in conjunction with the accompanying drawings.

BRIEF DESCRIPTION OF THE DRAWINGS

FIGS. 1 to 6 illustrate a knee bolster according to one embodiment of the present invention, wherein FIG. 1 is a front view of an instrument panel having a knee bolster mounted thereon;

FIG. 2 is a sectional view taken along a line II—II in FIGS. 1 and 3;

FIG. 3 is a sectional view taken along a line III—III in FIGS. 2, 4 and 5;

FIG. 4 is a sectional view taken along a line IV—IV in FIG. 3;

FIG. 5 is a sectional view taken along a line V—V in FIG. 3; and

FIG. 6 is an exploded perspective view of the knee bolster.

DESCRIPTION OF THE PREFERRED EMBODIMENT

The present invention will now be described by way of one embodiment with reference to the accompanying drawings.

Figure 1:
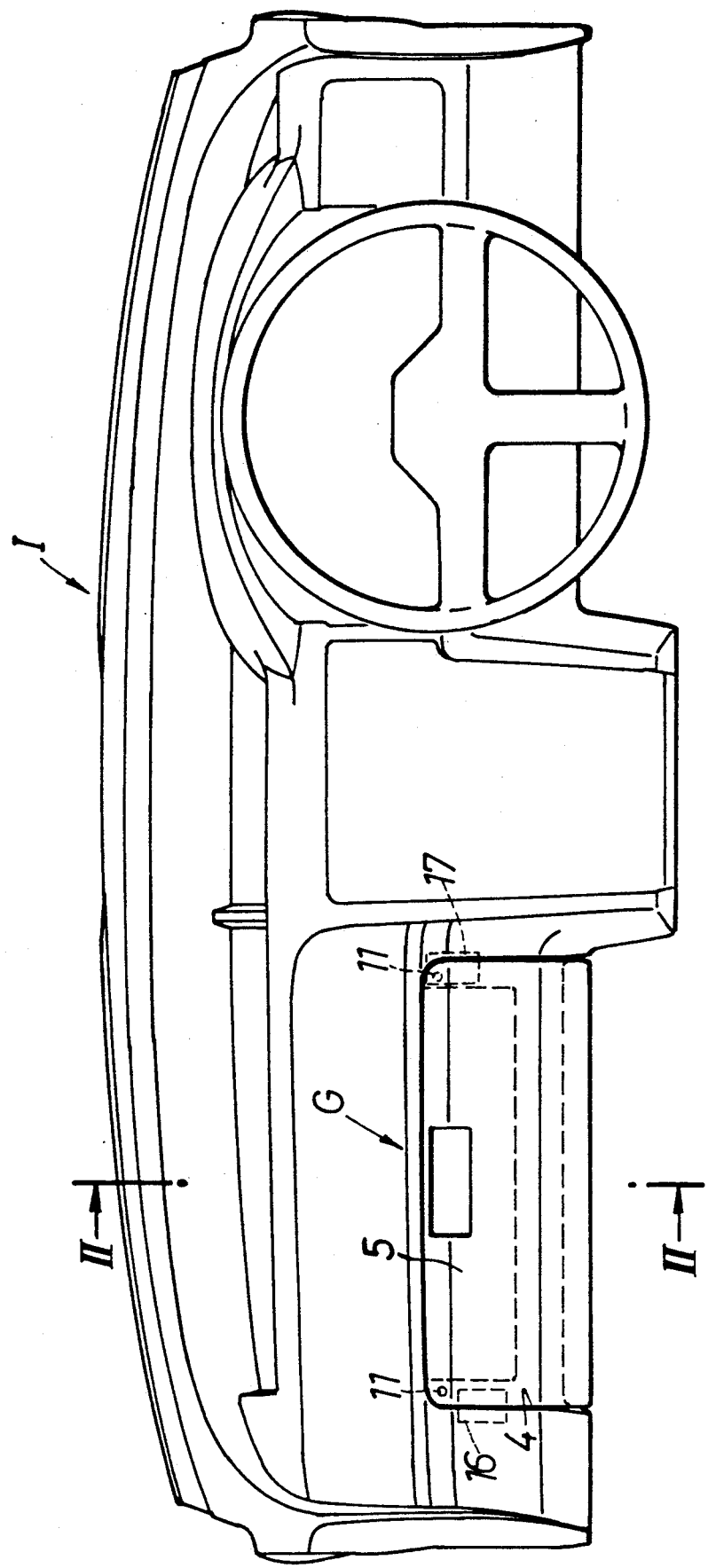

Referring to FIG. 1, a glove box G is openably and closably mounted on a left side of a instrument panel I disposed laterally of a front portion of a compartment of an automobile, so that the box is located in front of legs of a passenger sitting on an assistant seat.

Figure 2:
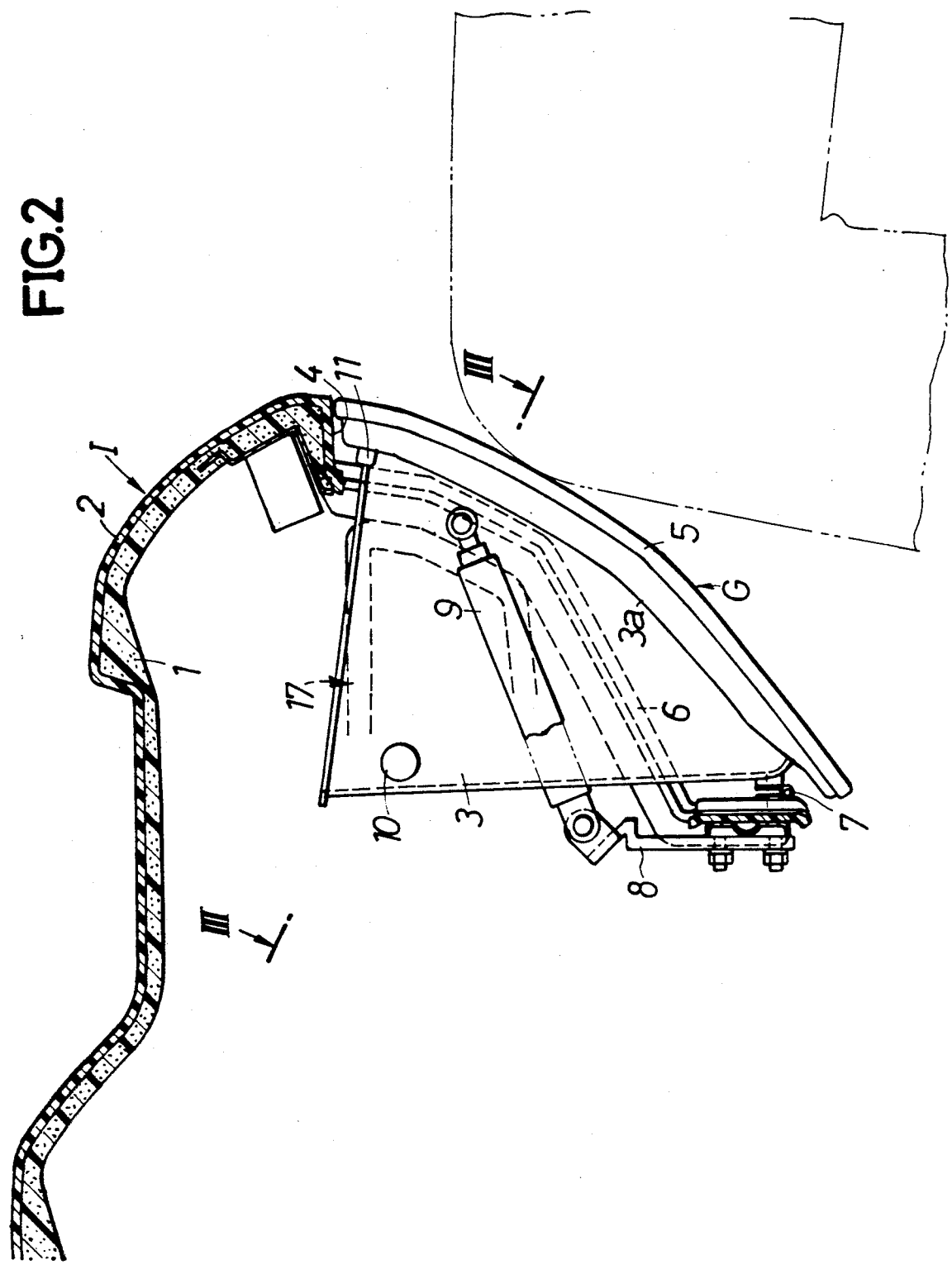
Figure 3:
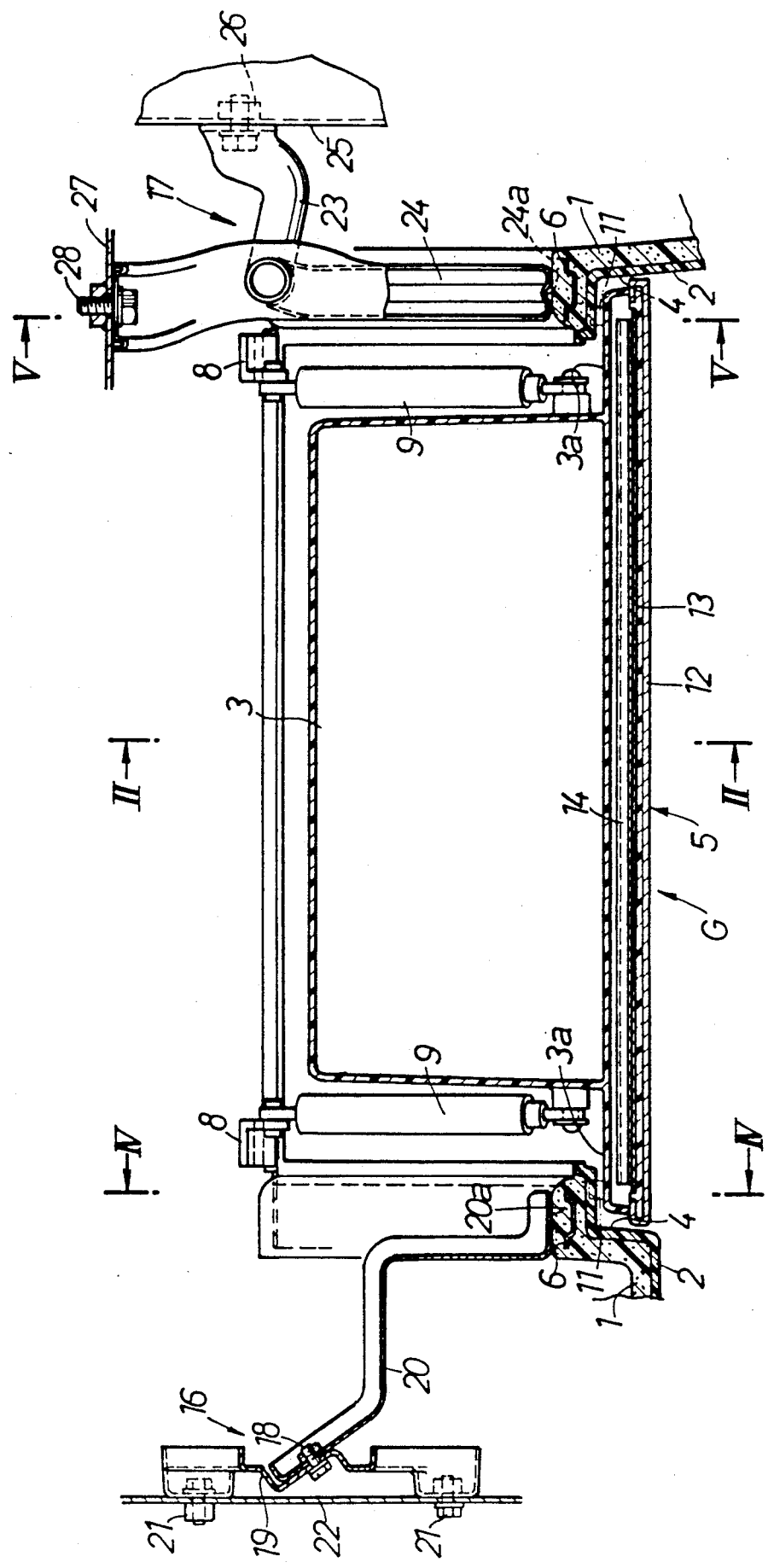

As shown in FIGS. 2 and 3, the instrument panel I has a structure in which a base material 1 made of a hard urethane is covered with a skin 2. The glove box G is comprised of a container-like body 3 opened at an upper face thereof, and a lid 5 fitted in an opening 4 of the instrument panel I to cover a front face of the body 3. The glove box G is pivotally supported at its lower end by a hinge shaft 7 mounted in a reinforcing plate 6 (which will be described in detail hereunder) for forward and backward pivotal movement and has left and right sidewalls connected through a pair of dampers 9, 9 to upper ends of stays 8, 8 raised from left and right lower ends of the reinforcing plate 6, respectively. The glove box G also has stoppers 10, 10 mounted on the left and right sidewalls thereof to project therefrom, so that an opened position of the glove box G is regulated by allowing the stoppers 10, 10 to abut against a peripheral edge of the opening 4 in the instrument panel I from a back side. On the other hand, the lid 6 has projections 11, 11 formed at left and right upper ends of a back thereof, so that a closed position of the glove box G is regulated by allowing the projections 11, 11 to abut against the peripheral edge of the opening 4 in the instrument panel I from the back side. When the glove box G is in the closed position, a gap δ is provided between the lid 5 and the peripheral edge of the opening 4 in the instrument panel I, as can be seen from FIGS. 4 and 5, the gap δ increasing in width as heading downward of the lid 5.

Figure 4:
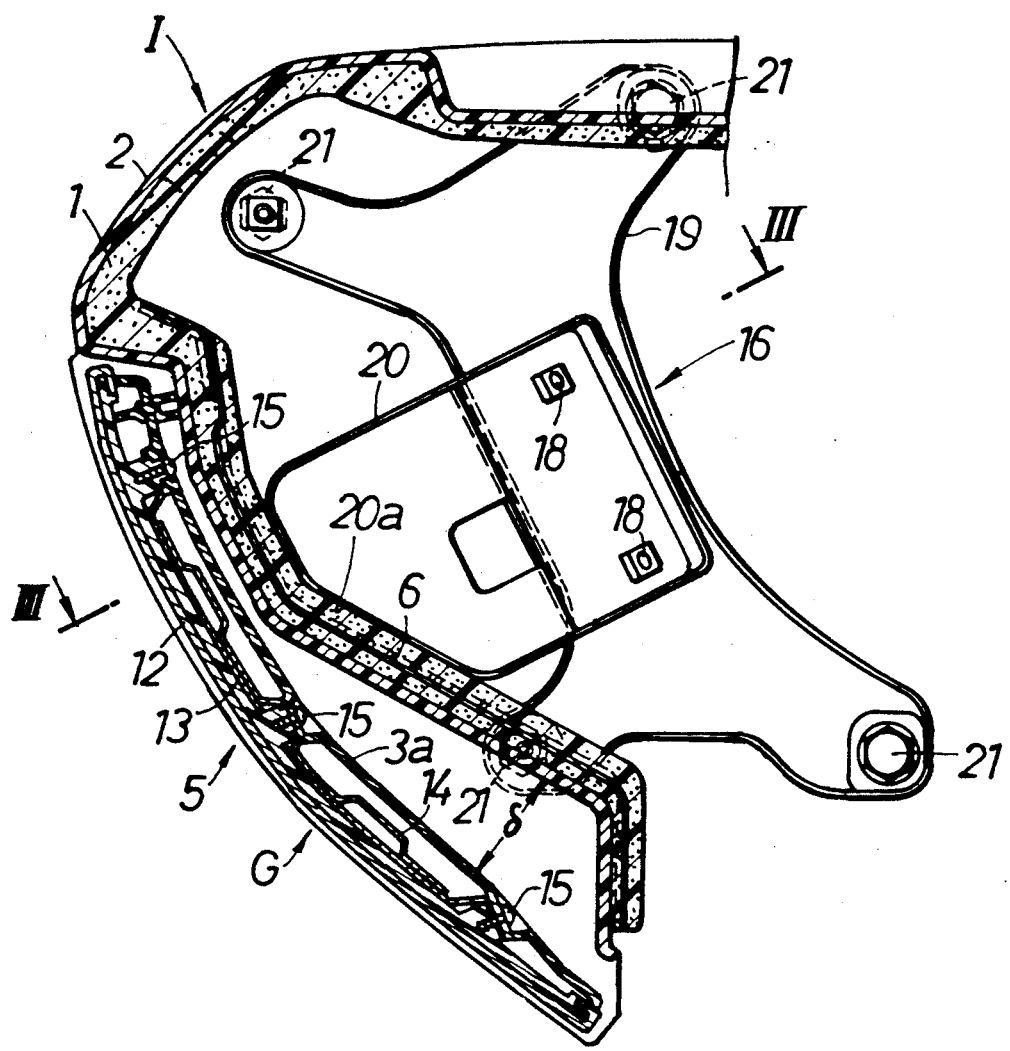
Figure 5:
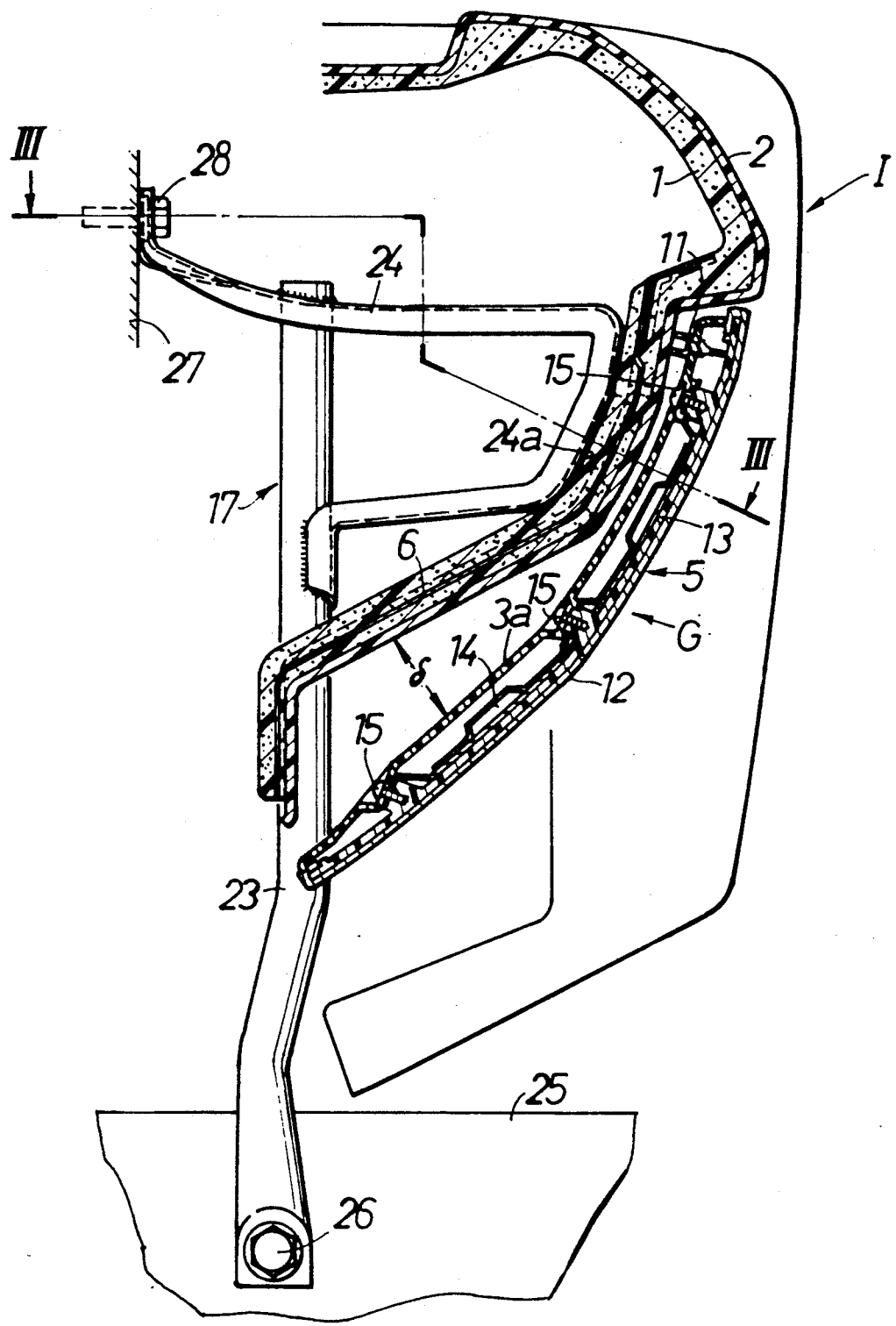
Figure 6:
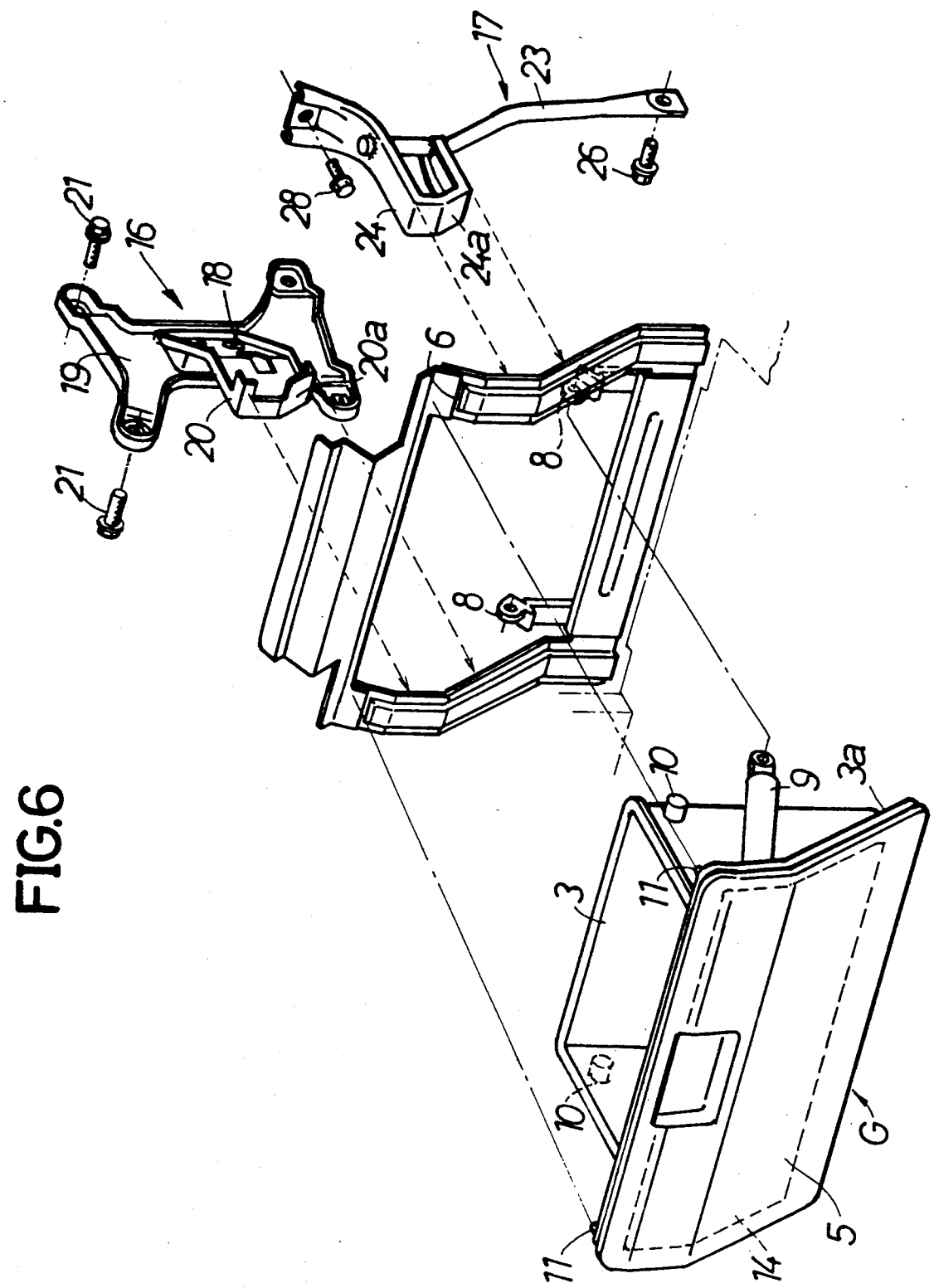

As can be seen from FIGS. 4 to 6, the lid 5 covering the surface of the body 3 of the glove box G includes a base plate 13 made of an ABS resin and covered with a skin 12. A shock absorbing member 14 in the form of a plate made of overlapped steel sheets and having a corrugated section is laminated on a back of the base plate 13. The laminated base plate 13 and shock absorbing member 14 are coupled together to a front plate 3a of the body 3 with a predetermined gap therebetween by clamping by screws 15 and thus, high rigidity and shock absorptivity are provided to the lid 5 by a laminated structure of such base plate 13, shock absorbing member 14 and front plate 3a.

The above-mentioned reinforcing plate 6 is provided on the peripheral edge of the opening 4 in the instrument panel I. The reinforcing plate 6 is formed by punching a steel sheet having a sufficient thickness into a rectangular frame form and integrally molded within the hard urethane base material 1 constituting the instrument panel I. The skin 2 covering the front of the reinforcing plate 6 is opposed to the front plate 3a covering an outer edge of the back of the lid 5 at the predetermined gap δ.

A pair of left and right load bearing members 16 and 17 are disposed in proximity to the opposite sides of the glove box G within the instrument panel I. The left load bearing member 16 is comprised of a plate like bracket 19 and an arm member 20 which are integrally coupled to each other by a bolt 18. The bracket 19 is secured to an inner panel 22 of a vehicle body by four bolts 21. The arm member 20 has an abutment surface 20a formed at its end and opposed to a left back of the reinforcing plate 6 leaving a gap therebetween corresponding to the thickness of the base material 1. On the other hand, the right load bearing member 17 is comprised of a stay 23 and an arm member 24 which are integrally secured to each other by welding. The stay 23 is secured at a lower end thereof to a floor tunnel 25 by a bolt 26, and the arm member 24 is secured at an upper end thereof to an inner panel 27 of the vehicle body by a bolt 28. The arm member 24 has an abutment surface 24a formed at its end and opposed to the right back of the reinforcing plate 6 leaving a gap for the thickness of the base material 1.

Description will now be made of the operation of the embodiment of the present invention having the above-described structure.

When the knees of the passenger are forwardly as a result of a collision of the automobile to strike against the lid 5 of the glove box G mounted on the instrument panel I, a load due to this striking is transmitted from the base plate 13 of the lid 5 to the shock absorbing member 14 made of a steel sheet and laminated on the back of the base plate 13. The shock absorbing member 14 which has received the load absorbs a shock while being plastically deformed toward the inside of the instrument panel I. In this case, the gap δ is provided between the outer edge of the back of the lid 5 and the peripheral edge of the opening 4 in the instrument panel I, thereby ensuring a stroke sufficient for plastic deformation of the shock absorbing member 14.

When the outer edge of the back of the lid 5 is permitted to abut against the peripheral edge of the opening 4 in the instrument panel I, the above-described load is transmitted to the frame-like reinforcing plate G buried in the instrument panel I and absorbed in a distributed manner over the entire periphery of the reinforcing plate 6. At this time, a further improved shock absorbing effect is provided, because the hard urethane base material 1 constituting the instrument panel I is interposed between the back of the lid 5 and the reinforcing plate 6.

If the load due to the collision is too large to be borne by the reinforcing plate 6, then the back of the reinforcing plate 6 deflected rearwardly transmits the load to the abutment surfaces 20a and 24a of the left and right load bearing members 16 and 17. The load bearing members 16 and 17 can reliably bear the load transmitted from the reinforcing plate 6, because they are formed more firmly as compared with the shock absorbing member 14 and the reinforcing plate 6 and moreover, are connected at ends thereof to the inner panels 22 and 27 of the vehicle body and the floor tunnel 25. In addition, the base material made of a hard urethane is interposed between the reinforcing plate 6 and the load bearing members 16 and 17, so that the shock is also absorbed by the base material 1.

In this manner, the load applied from the knees of the passenger to the surface of the lid 5 of the glove box G is first absorbed by plastic deformation of the shock absorbing member 14 buried in the lid 5 and further transmitted to and absorbed by the reinforcing plate 6 buried in the instrument panel I and by the left and right load bearing members 16 and 17 supported on the vehicle body.

Although one embodiment of the present invention has been described, it will be understood that the present invention is not limited thereto, and many minor variations in design can be made without departing from the scope of the present invention as defined in a claim.

For example, the knee bolster of the above embodiment has been constructed such that the outside size of the shock absorbing member 14 is slightly smaller than the inside size of the reinforcing plate 6, so that a load is not directly transmitted from the shock absorbing member 14 to the reinforcing plate 6. However, the bolster may be constructed such that the shock absorbing member 14 may be sized to overlap the reinforcing plate 6, so that a load may be directly transmitted to the reinforcing plate 6. In addition, a part to which one end of each of the load bearing members 16 and 17 is secured is not limited to the inner panels 22 and 27 and the floor tunnel 25 and may be any other member of a vehicle body having a predetermined strength.

What is claimed is:

1. A knee bolster comprising
    a lid which covers a surface of a glove box mounted in an opening made in that surface of an instrument panel opposed to knees of a passenger and which has a plate-like shock absorbing member mounted on the lid,
    a reinforcing plate disposed along a peripheral edge of the opening of said instrument panel so as to be opposed to an outer edge of a back of said shock absorbing member, and
    a load bearing member fixed at one end thereof to a vehicle body and opposed at the other end to a back of said reinforcing plate.

2. The knee bolster according to claim 1, wherein said load bearing member comprises a pair of left and right members which are opposed to left and right side portions of the back of the reinforcing plate, respectively.

3. The knee bolster according to claim 1 or 2, wherein a base material for forming said instrument panel is also interposed between the reinforcing plate and a back of the lid.

4. The knee bolster according to claim 1 or 2, wherein said load bearing member is formed to be more rigid than the shock absorbing member and the reinforcing plate.

5. The knee bolster according to claim 2, wherein one of the pair of left and right members is fixed to an inner panel of the vehicle body and the other of the left and right members is fixed to a floor tunnel of the vehicle body.

6. The knee bolster according to claim 1 or 2, wherein a base material for forming said instrument panel is also interposed between the load bearing member and the reinforcing plate.

7. The knee bolster according to claim 1 or 2, wherein a gap is provided between the lid and the peripheral edge of the opening of the instrument panel when the lid is in a position closing said opening.

8. The knee bolster for an automobile having an instrument panel in a passenger compartment, comprising:
a lid for covering an opening for a glove box provided in the instrument panel and including a plate-like shock absorbing member therein;
a reinforcing plate buried in the instrument panel so as to surround an entire peripheral edge of said opening and to be opposed to an outer edge of the lid; and
a load bearing member opposed to a back of said reinforcing member and fixed to a vehicle body.

9. The knee bolster according to claim 8, wherein said load bearing member bears said back of the reinforcing plate via a base material for forming the instrument panel interposed therebetween.

10. The knee bolster according to claim 8 or 9, wherein said reinforcing plate is comprised of a punched steel sheet of rectangular frame form.

11. The knee bolster according to claim 8 or 9, wherein said shock absorbing member is formed of steel sheets overlapped one on another and a gap is provided between a back of the lid and the peripheral edge of the opening.

* * * * *